(12) United States Patent
Marcoccia et al.

(10) Patent No.: US 9,297,111 B1
(45) Date of Patent: Mar. 29, 2016

(54) METHODS FOR THE MANUFACTURE OF CELLULOSE NANOCRYSTALS

(71) Applicant: Domtar Corporation, Montreal (CA)

(72) Inventors: Bruno Marcoccia, Charlotte, NC (US); Michael Edwards, Waxhaw, NC (US); Marvin Duncan Cooper, Bennettsville, SC (US)

(73) Assignee: Domtar Paper Company, LLC, Fort Mill, SC (US)

(*) Notice: Subject to any disclaimer, the term of this patent is extended or adjusted under 35 U.S.C. 154(b) by 2 days.

(21) Appl. No.: 14/208,759

(22) Filed: Mar. 13, 2014

Related U.S. Application Data

(60) Provisional application No. 61/789,218, filed on Mar. 15, 2013.

(51) Int. Cl.
*D21C 9/00* (2006.01)
*C01B 17/82* (2006.01)
*C08B 15/08* (2006.01)
*D21C 5/00* (2006.01)
*C13K 1/04* (2006.01)
*C01B 17/90* (2006.01)

(52) U.S. Cl.
CPC .............. *D21C 9/004* (2013.01); *C01B 17/903* (2013.01); *C08B 15/08* (2013.01); *C13K 1/04* (2013.01); *D21C 5/00* (2013.01)

(58) Field of Classification Search
CPC ......... C13K 1/04; C01B 17/925; D21C 9/004
See application file for complete search history.

(56) References Cited

U.S. PATENT DOCUMENTS

| 4,608,245 | A | 8/1986 | Gaddy et al. |
| 2011/0294181 | A1 | 12/2011 | Weydahl |
| 2012/0135489 | A1 | 5/2012 | Weydahl |

FOREIGN PATENT DOCUMENTS

| WO | WO 2010/046619 | 4/2010 |
| WO | WO 2010/146331 | 12/2010 |

OTHER PUBLICATIONS

Wang et al., Approaching zero cellulose loss in cellulose nanocrystal (CNC) production: recovery and characterization of cellulosic solid residues (CSR) and CNC, Aug. 22, 2012, Cellulose, 1(, p. 2033-2047.*
Lehmann, R., Total vista ensured—Fast and easy handling simplifies design in the process industry, Chemical Plants and Processing, International Journal of Chemical and Pharmaceutical Engineering, web page at www.cpp-net.com/2110400, 2010.
Peng, B. et al., Chemistry and applications of nanocrystalline cellulose and its derivatives: a nanotechnology perspective, The Canadian Journal of Chemical Engineering, vol. 9999, 16 pages, 2011.

* cited by examiner

*Primary Examiner* — Anthony Calandra
(74) *Attorney, Agent, or Firm* — Kilpatrick Townsend & Stockton

(57) ABSTRACT

Embodiments of the present invention relates generally to methods and systems for the manufacture of cellulose nanocrystals. In one embodiment, a method for manufacturing cellulose nanocrystals comprises reacting lignocellulosic fibers with sulfuric acid in water, introducing a water-insoluble solvent to substantially terminate the reaction, separating a first stream comprising at least 70% of the unreacted sulfuric acid in the water-insoluble solvent from a second stream comprising a plurality of cellulose nanocrystals and the remainder of the unreacted sulfuric acid in water, and separating the cellulose nanocrystals from the second stream.

25 Claims, 3 Drawing Sheets

METHODS FOR THE MANUFACTURE OF CELLULOSE NANOCRYSTALS

CROSS-REFERENCE TO RELATED APPLICATION

Figure 1:
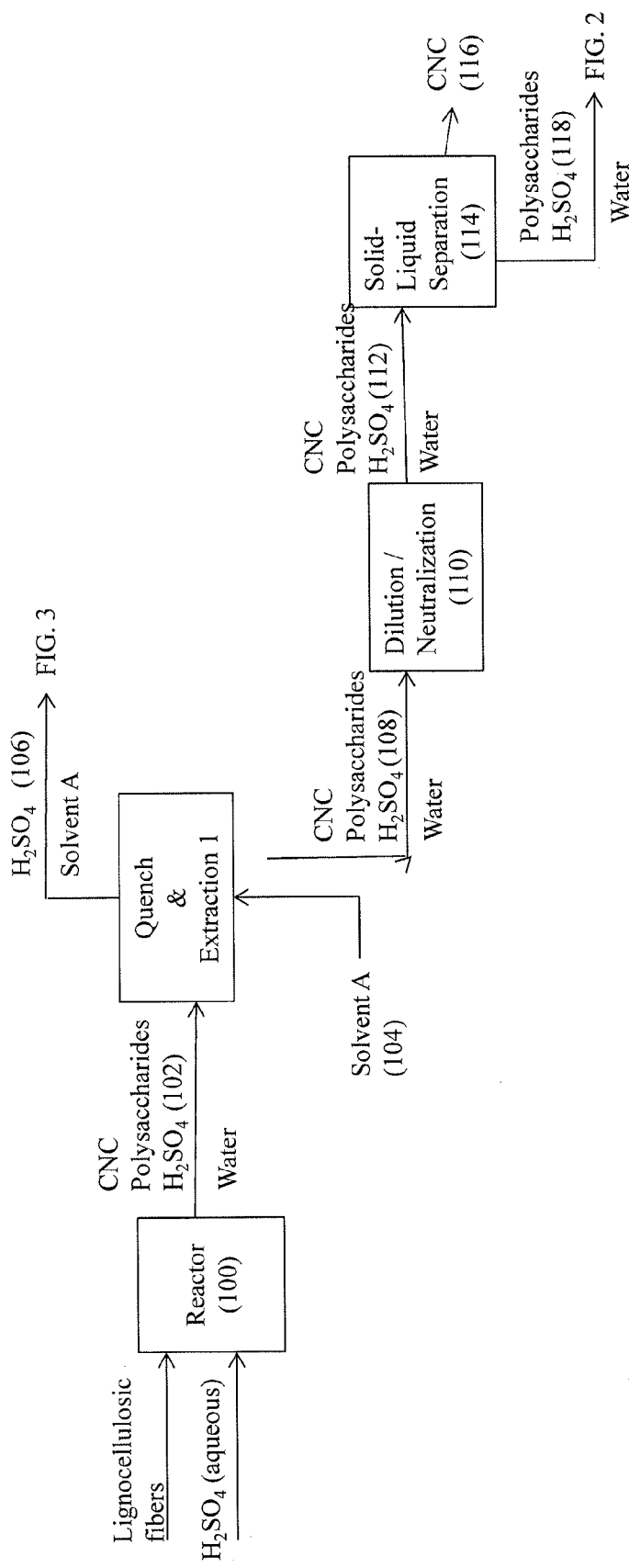

This application claims priority to U.S. Provisional Patent Application Ser. No. 61/789,218, filed on Mar. 15, 2013, the entire disclosure of which is hereby incorporated by reference.

FIELD OF THE INVENTION

The present invention relates generally to methods and systems for the manufacture of cellulose nanocrystals.

BACKGROUND

Pulp fibers, such as wood pulp fibers, are used in a variety of products including, for example, pulp, paper, paperboard, biofiber composites (e.g., fiber cement board, fiber reinforced plastics, etc.), absorbent products (e.g., fluff pulp, hydrogels, etc.), specialty chemicals derived from cellulose (e.g., cellulose acetate, carboxymethyl cellulose (CMC), etc.), and other products. The pulp fibers can be obtained from a variety of wood types including hardwoods (e.g., oak, gum, maple, poplar, eucalyptus, aspen, birch, etc.), softwoods (e.g., spruce, pine, fir, hemlock, southern pine, redwood, etc.), and non-woods (e.g., kenaf, hemp, straws, bagasse, etc.).

Cellulose nanocrystals ("CNC") are a relatively new class of material that is made from renewable bio-material feedstock (e.g., lignocellulosic-derived fibers) having remarkable strength, optical, and/or structural properties. CNC are also referred to as nanocrystalline cellulose ("NCC"). While the present application will generally use the terms cellulose nanocrystals or CNC, it should be understood that such terms are used interchangably with nanocrystalline cellulose or NCC. CNC are one of several types of cellulose-based nanoparticles (i.e., particles having at least one dimension less than 100 to 150 nm). Other types of cellulose nanoparticles include nanofibrillated cellulose and tempo-oxidized cellulose.

Compared to other cellulose derived nanoparticles, CNC are distinguished by a relatively high purity of crystalline cellulose, relatively uniform particle size distribution, and the presence of sulfate functional groups bonded to the cellulose molecules. The sulfate groups are the result of the method and conditions of manufacture, and play a key role in determining CNC's unique and potentially valuable properties.

Typically, bleached (or lignin free) pulps are used as feedstock into the reaction that forms CNC. These pulps can be either kraft, soda, or sulfite based pulps, either hardwood or softwood or even non wood pulps, and can be bleached free of lignin in any number of sequences presently practiced in the pulp manufacturing industry.

An exemplary, existing method of manufacturing CNC involves reacting lignocellulosic fibers with aqueous sulfuric acid in the 40 to 60% concentration range at relatively low temperatures (e.g., less than 100° C.), for relatively short and discrete times. The resultant hydrolysis reaction is stopped by dilution and cooling with quench water, which is introduced at a cooler temperature than the reaction mixture. Water will typically be introduced in an amount that is about ten times greater than the amount of reaction mixture in order to slow the reaction. It is important to control the extent of the hydrolysis reaction in order to control the yield and degree of sulfonation to within desired ranges. The extent of the hydrolysis reaction is impacted by the reactant concentrations, temperature, and time, along with the use of a quench dilution/cooling stage.

Typically, the resultant yields are in the range of 35 to 65% with a sulfate content of between 1% and 5% by weight based on the otherwise pure, crystalline cellulose particles. In other words, a significant amount of feedstock (35 to 65% depending on the resultant yield) is dissolved into the aqueous acid phase. The vast majority of sulfuric acid is unreacted. After termination of the hydrolysis reaction by quenching with water, the resultant mixture of crystalline cellulose particles, sulfuric acid, dissolved polysaccharides, other non-polysaccharide materials removed from the feedstock, and water must be separated. The CNC must then be washed, neutralized, and in some cases, dried.

Present methods for recovering CNC involve first separating the (relatively dilute) acid and polysaccharides from the CNC by means of a solid-liquid separation unit operation such as barrier screening, centrifugation, ultra filtration, nanofiltration, and/or dialysis.

SUMMARY

Various embodiments of the present invention relate to methods and systems for the manufacture or production of cellulose nanocrystals. In some embodiments, methods for manufacturing cellulose nanocrystals comprise reacting lignocellulosic fibers with sulfuric acid in water, introducing a water-insoluble solvent to substantially terminate the reaction, separating a first stream comprising at least 70% of the unreacted sulfuric acid in the water-insoluble solvent from a second stream comprising a plurality of cellulose nanocrystals and the remainder of the unreacted sulfuric acid in water, and separating the cellulose nanocrystals from the second stream.

Methods for manufacturing cellulose nanocrystals, in some embodiments, comprise reacting lignocellulosic fibers with sulfuric acid in water, introducing a water-insoluble solvent to the solution to substantially terminate the reaction, separating a first stream comprising at least 70% of the unreacted sulfuric acid in the water-insoluble solvent from a second stream comprising a plurality of cellulose nanocrystals and the remainder of the unreacted sulfuric acid in water, adjusting the pH of the second stream to greater than about 1, separating the cellulose nanocrystals from the second stream, and recovering substantially all of the unreacted sulfuric acid in the second stream.

These and other embodiments of the present invention are described in greater detail in the Detailed Description which follows.

BRIEF DESCRIPTION

Figure 2:
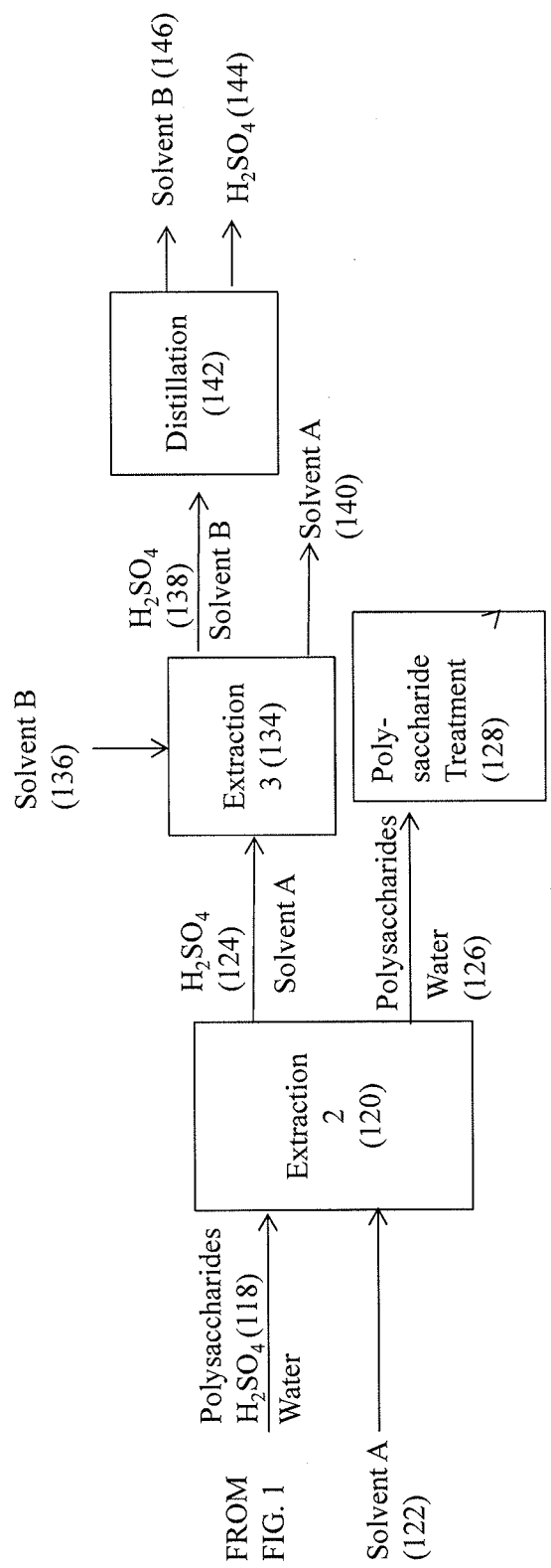
Figure 3:
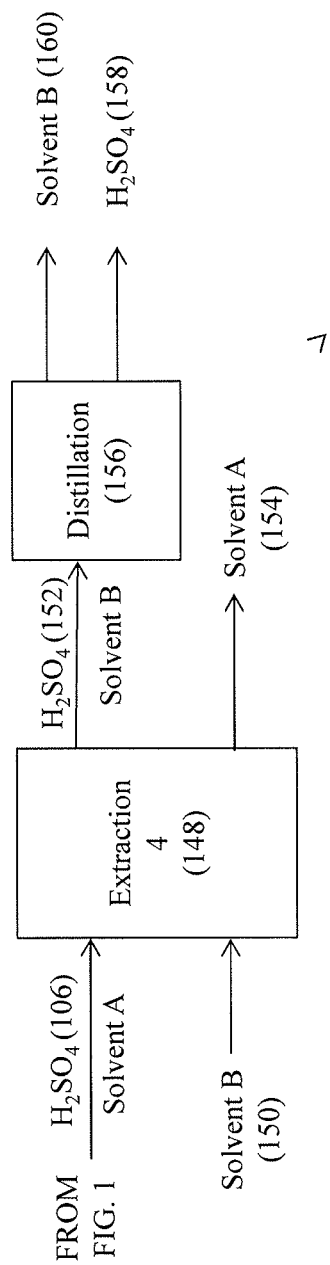

FIGS. 1-3 are a series of block diagrams illustrating methods and systems for manufacturing cellulose nanocrystals according to some embodiments of the present invention.

DETAILED DESCRIPTION

As noted above, cellulose nanocrystals ("CNC") are a relatively new class of material that is made from renewable bio-material feedstock (e.g., lignocellulosic-derived fibers) having remarkable strength, optical, and/or structural properties. Compared to other cellulose derived nanoparticles (e.g., nanofibrillated cellulose, tempo-oxidized cellulose, etc.), CNC can be distinguished by a relatively high purity of crystalline cellulose, relatively uniform particle size distribution, and the presence of sulfate functional groups bonded to the cellulose molecules. As a result of CNC's source in biomaterial feedstock and the various advantageous properties of CNC, it would be desirable to have new methods and systems for the manufacture or production of CNC.

Accordingly, various embodiments of the present invention relate to methods and systems for the manufacture or production of cellulose nanocrystals. While embodiments of the present invention involve the reaction of lignocellulosic fibers with aqueous sulfuric acid to produce CNC, embodiments of the present invention advantageously quench the reaction by introducing a water-insoluble solvent that also facilitates termination of the reaction by separating the sulfuric acid from the CNC. Thus, in some embodiments, introduction of the water-insoluble solvent can simultaneously quench the reaction and separate the sulfuric acid from the CNC and other materials. The separation of the sulfuric acid from the CNC can be conducted utilizing liquid-liquid extraction techniques. In some embodiments, liquid-liquid extraction can be employed downstream for other separation steps used in the production of CNC. For example, some sulfuric acid may remain in an aqueous stream with the CNC or other components, and a water-insoluble solvent can be introduced to separate the sulfuric acid from the other components utilizing liquid-liquid extraction techniques. Other aspects of various embodiments of methods and systems of the present invention are discussed herein.

In some embodiments, methods of the present invention comprise reacting lignocellulosic fibers with sulfuric acid in water, introducing a water-insoluble solvent to substantially terminate the reaction, separating a first stream comprising at least 70% of the unreacted sulfuric acid in the water-insoluble solvent from a second stream comprising a plurality of cellulose nanocrystals and the remainder of the unreacted sulfuric acid in water, and separating the cellulose nanocrystals from the second stream. The first stream can be separated from the second stream using liquid-liquid extraction techniques based on differences in the properties of the water-insoluble solvent in the first stream and water in the second stream. For example, the water-insoluble solvent can advantageously substantially terminate the reaction by both quenching the reaction mixture (e.g., by diluting the mixture and reducing the temperature) and separating the unreacted sulfuric acid from the CNC based on the insolubility of the solvent in water and related properties. The second stream can be diluted with water and/or neutralized prior to separation of the CNC in some embodiments. In some embodiments, the second stream further comprises dissolved polysaccharides. In some embodiments, the first stream comprises at least 80% of the unreacted sulfuric acid. The first stream, in some embodiments, comprises between 80% and 95% of the unreacted sulfuric acid. The first stream comprises substantially all of the unreacted sulfuric acid in some embodiments.

In some embodiments, substantially all of the unreacted sulfuric acid in the first stream can be recovered. To recover the unreacted sulfuric acid in the first stream, a second water-insoluble solvent can be introduced or added to the first stream resulting in a third steam comprising substantially all of the unreacted sulfuric acid and the second water-insoluble solvent as well as a fourth stream comprising the first water-insoluble solvent. The unreacted sulfuric acid can then be separated from the second water-insoluble solvent using conventional techniques such as distillation. The second water-insoluble solvent is different from the first water-insoluble solvent in some embodiments to facilitate separation and collection of the third stream and the fourth stream using liquid-liquid extraction. For example, in some embodiments, the second-water insoluble solvent that collects the unreacted sulfuric acid can have a lower boiling point than the first water-insoluble solvent.

While most of the unreacted sulfuric acid may be in the first stream with the water-insoluble solvent, some unreacted sulfuric acid may remain in the second stream with water and other materials (e.g., CNC, polysaccharides, etc.). Thus, in some embodiments, substantially all of the unreacted sulfuric acid in the second stream can be recovered. In some embodiments, the recovery of substantially all of the unreacted sulfuric acid can occur after the separation of CNC from the second stream. To recover the unreacted sulfuric acid in the second stream, a second water-insoluble solvent can be introduced or added to the second stream resulting in a third stream comprising substantially all of the unreacted sulfuric acid and the second water-insoluble solvent as well as a fourth stream comprising water and potentially other materials (e.g., uncollected CNC, polysaccharides, etc.). The third stream can be separated from the fourth stream using liquid-liquid extraction techniques based on differences in the properties of the second water-insoluble solvent in the third stream and water in the fourth stream. The second water-insoluble solvent can be the same solvent as the first water-insoluble solvent used to separate the first stream in some embodiments (e.g., the same solvent from a chemical perspective, but not necessarily the same actual solvent that was used in the first separation).

The unreacted sulfuric acid in the third stream can then be separated from the second water-insoluble solvent in some embodiments. For example, in some embodiments, the unreacted sulfuric acid can be separated from the third stream by introducing or adding a third water-insoluble solvent to the third stream resulting in a fifth steam comprising substantially all of the unreacted sulfuric acid and the third water-insoluble solvent as well as a sixth stream comprising the second water-insoluble solvent. The fifth stream can be separated from the sixth stream using liquid-liquid extraction techniques based on differences in the properties of the third water-insoluble solvent in the fifth stream and the second water-insoluble solvent in the sixth stream. The unreacted sulfuric acid can then be separated from the third water-insoluble solvent using conventional techniques such as distillation.

In order to achieve such a separation, the third water-insoluble solvent is different from the second water-insoluble solvent. While the sulfuric acid had been isolated to the second water-insoluble solvent, transferring the sulfuric acid to a third water-insoluble solvent may be desirable from a cost/energy standpoint. For example, if the third water-insoluble solvent has a lower boiling point than the second water-insoluble solvent, it may be more cost/energy-efficient to separate the sulfuric acid from the third water-insoluble solvent. For those embodiments where the first and second water-insoluble solvents are the same chemical species, the third water-insoluble solvent would likewise differ from both the first and the second water-insoluble solvents.

In some embodiments, methods of the present invention comprise reacting lignocellulosic fibers with sulfuric acid in water, introducing a water-insoluble solvent to the solution to substantially terminate the reaction, separating a first stream comprising at least 70% of the unreacted sulfuric acid in the water-insoluble solvent from a second stream comprising a plurality of cellulose nanocrystals and the remainder of the unreacted sulfuric acid in water, adjusting the pH of the second stream to greater than about 1, separating the cellulose nanocrystals from the second stream, and recovering substantially all of the unreacted sulfuric acid in the second stream. In some embodiments, recovering substantially all of the unreacted sulfuric acid in the second stream comprises introducing a second water-insoluble solvent to the second stream, separating a third stream comprising substantially all of the unreacted sulfuric acid and the second water-insoluble solvent from a fourth stream comprising water, and separating substantially all of the unreacted sulfuric acid from the second water-insoluble solvent. In some embodiments, adjusting the pH of the second stream comprises adding water to the second stream. Adjusting the pH of the second stream, in some embodiments, can further comprise adding a basic material to the second stream. Additional embodiments are described herein.

Various embodiments of the present invention will now be discussed in connection with the Figures. FIGS. 1-3 are a series of block diagrams illustrating methods and systems for manufacturing cellulose nanocrystals according to some embodiments of the present invention. Due to page size limitations, the block diagram that begins in FIG. 1 continues over to FIGS. 2 and 3 as indicated. While FIGS. 1-3 in their entirety illustrate a single overall method and system, it should be understood that various sub-parts or aspects of the method/system illustrated in FIGS. 1-3 may themselves represent different embodiments of the present invention.

FIG. 1 begins with the reaction of lignocellulosic fibers with aqueous sulfuric acid in reactor 100. The reaction conditions (e.g., amounts of fibers and sulfuric acid, concentration of sulfuric acid, reaction temperature, etc.) can be those known to those of skill in the art although, as described below, the reaction will be quenched in a different manner according to embodiments of the present invention. As noted above, typically, bleached (or lignin free) pulps are used as feedstock into the reactor. These pulps can be either kraft, soda, or sulfite based pulps, either hardwood or softwood or even non wood pulps, and can be bleached free of lignin in any number of sequences presently practiced in the pulp manufacturing industry. Feedstocks comprising lignocellulosic fibers also typically comprise some amount of dissolved polysaccharides. The feedstock can comprise 45% to 65% dissolved polysaccharides in some embodiments.

The lignocellulosic fibers can be provided to the reactor 100 using techniques known to those of skill in the art. The fibers react with sulfuric acid to form CNC via a hydrolysis reaction. The sulfuric acid can be provided to the reactor 100 using techniques known to those of skill in the art. The sulfuric acid, for example, can be provided at a concentration of 40-60% in water, and the reaction can occur at a relatively low temperature (e.g., less than 100° C.), as known to those of skill in the art.

It is important to control the extent of the hydrolysis reaction (e.g., concentrations, temperature, and time) in order to control the yield and degree of sulfonation to within desired ranges. Conventionally, the hydrolysis reaction is stopped by dilution and cooling with quench water. However, according to embodiments of the present invention, the hydrolysis reaction can be stopped by introducing a water-insoluble solvent to terminate the hydrolysis reaction. Rather than terminating the hydrolysis reaction solely by dilution, the water-insoluble solvent quenches the reaction primarily by causing the sulfuric acid to migrate out of the aqueous phase (which contains dissolved polysaccharides and CNC) and into the water-insoluble solvent as the solvent is not miscible with water. This separation of the sulfuric acid from the aqueous phase comprising the CNC is also advantageous because it both quenches the reaction and separates a substantial amount of the sulfuric acid in some embodiments, which would otherwise need to be performed downstream of the reaction.

As shown in FIG. 1, Solvent A 104 can be introduced to the reaction mixture 102 of CNC, polysaccharides, sulfuric acid, and water. Solvent A is a sulfuric acid-specific, water insoluble solvent. In other words, Solvent A can selectively remove sulfuric acid from the reaction mixture while not mixing with the aqueous phase of the reaction mixture. Examples of solvents that can be used as Solvent A in some embodiments of the present invention include, without limitation, alkane alcohols such as heptanol. The amount of Solvent A to be utilized can be determined by those skilled in the art based on the amount and flow rate of the reaction mixture, the amount of sulfuric acid in the reaction mixture, the size of the liquid-liquid extraction equipment, and other factors.

By removing sulfuric acid from the reaction mixture, Solvent A can advantageously terminate the reaction and also separate sulfuric acid from the CNC. It should be noted that Solvent A will not likely remove all sulfuric acid from the aqueous phase (as reflected in FIG. 1). In some embodiments, Solvent A removes the majority of the sulfuric acid from the aqueous phase (102). Solvent A removes at least 70% of the sulfuric acid in the aqueous phase (102) leaving the reactor (100) in some embodiments. Solvent A, in some embodiments, removes at least 80% of the sulfuric acid in the aqueous phase (102) leaving the reactor (100). In some embodiments, Solvent A removes between 80% and 95% of the sulfuric acid in the aqueous phase (102) leaving the reactor (100). Solvent A, in some embodiments, removes substantially all of the sufuric acid in the aqueous phase (102) leaving the reactor (100). The amount of sulfuric acid removed by Solvent A can be adjusted based on a number of factors including, for example, the amount of Solvent A used and the size of the extractor.

Additional steps to recover sulfuric acid from the aqueous phase comprising the CNC and polysaccharides (108) may be implemented in some embodiments as shown, for example, in FIG. 2. Following introduction of Solvent A 104, liquid-liquid extraction techniques can be utilized to separate a stream 106 comprising sulfuric acid and Solvent A from the aqueous stream 108 comprising CNC, polysaccharides, and any remaining sulfuric acid. The sulfuric acid can be separated from Solvent A in stream 106 in some embodiments and such separation is discussed further in connection with FIG. 3 below.

In connection with aqueous stream 108 which comprises CNC, polysaccharides, and some residual sulfuric acid, the stream 108 can be diluted with water and/or neutralized, in some embodiments, as reflected in block 110. For example, following the quenching and termination of the reaction with Solvent A, stream 108 can be somewhat viscous (e.g., a thick paste in some instances) and water may be added to dilute the stream 108. The dilution of stream 108 with water can make it flow more easily and can also increase the pH of the stream 108. Persons of ordinary skill in the art will recognize that water can be added, in appropriate amounts, at various locations prior to, during, and after introduction of Solvent A 104 to quench the reaction and extract the sulfuric acid. The amount of water added can depend, for example, on the desired viscosity of stream 108, the desired pH of the stream 108, and other factors.

The pH of stream 108 following the hydrolysis reaction can be further increased by the addition of lime or other suitable basic materials in some embodiments. For example, it may be desirable to increase the pH of stream 108 to greater than 1 in some embodiments, or to greater than 2 in other embodiments. Increasing the pH can, for example, insure that the hydrolysis reaction has terminated. As another example, increasing the pH can also reduce downstream capital costs associated with equipment as the stream 108 would be less corrosive and would not necessarily require glass-lined pipes and equipment or other increased pipe and equipment expenses associated with transport and handling of acidic materials. In some embodiments, it may be desirable to increase the pH of stream 108 to be greater than 7. By doing so, in some embodiments, such an increase in pH at this stage of method can eliminate the need to do so later (e.g., following solid-liquid separation (114)).

Once the stream 108 is diluted and/or neutralized 110, as desired, the CNC can be separated from the stream 112 using conventional solid-liquid separation 114 techniques. Prior to the separation of the CNC, the stream 108 comprising CNC, in the embodiment shown, continues to include dissolved polysaccharides. Persons of ordinary skill in the art can identify the appropriate solid-liquid separation 114 technique and equipment, and such techniques can include, without limitation, centrifugation, ultrafiltration, nanofiltration, dialysis of the diluted reaction mixture, or combinations thereof. The solid-liquid separation 114 results in separation of the CNC 116 from an aqueous stream 118 comprising polysaccharides and residual sulfuric acid. Once the CNC 116 are separated, various techniques known to those of skill in the art including, for example, the use of one or more solvent dryers, can be implemented to remove any residual water or other solvent remaining with the CNC 116. Prior to removal of any residual water or other solvent remaining with the CNC 116 via drying, for example, any such liquid remaining with the CNC 116 may be neutralized using techniques known to those of skill in the art. As noted above, due to various remarkable properties of CNC, the CNC can then be utilized, or further processed for utilization, in a variety of applications and products.

While the desirable production of CNC is the result of some embodiments of the present invention, further embodiments of the present invention also include techniques for recovery of other materials used in the production of CNC. For example, as illustrated in the embodiment shown in FIG. 2, some embodiments comprise methods for recovering the remaining sulfuric acid from stream 118, recovering polysaccharides from stream 118, and recovering the various solvents (e.g., Solvent A or Solvent B). The recovery of such materials can be advantageous, for example, because the materials can be re-used in the methods of producing CNC, in other aspects of methods of the present invention, or in other methods.

As shown in FIG. 2, the sulfuric acid remaining in stream 118 can be removed. A second liquid-liquid extraction can be performed by introducing a sulfuric acid-specific, water insoluble solvent 122 to the stream 118 in a liquid-liquid extraction unit 120. In some embodiments, including the one shown in FIG. 2, the sulfuric acid-specific, water insoluble solvent 122 can be the same (Solvent A) as used in the liquid-liquid extraction to extract sulfuric acid from the aqueous stream 108 of CNC and polysaccharides following the hydrolysis reaction. In other embodiments, a different solvent 122 can be used in this extraction 120. In the particular embodiment shown in FIG. 2, the solvents 104,122 are the same. In this second extraction 120, Solvent A 122 can selectively remove sulfuric acid from the aqueous stream 118 while not mixing with the aqueous phase. Examples of solvents that can be used as Solvent A 122 in some embodiments of the present invention include, without limitation, alkane alcohols such as heptanol. The amount of Solvent A to be utilized can be determined by those skilled in the art based on the amount and flow rate of the aqueous stream 118, the amount of sulfuric acid in the aqueous stream 118, the size of the liquid-liquid extraction equipment, and other factors.

After the liquid-liquid extraction 120 using Solvent A 122, a stream 124 comprising sulfuric acid and Solvent A and another stream 126 comprising polysaccharides and water leave the extraction equipment.

Regarding the stream 126 comprising polysaccharides and water, one or more treatment steps 128 known to those of skill in the art can be used to handle the polysaccharides in stream 126. For example, in some embodiments, the polysaccharides can be sent to a waste treatment facility for aerobic or anaerobic digestion of the polysaccharides using techniques known to those of skill in the art. Some such embodiments can result in the reduction of BOD and/or COD values and the potential generation of useful methane gas. As another example, the stream 126 comprising polysaccharides and water can be converted using other chemical conversion techniques, such as fermentation, to convert the polysaccharides to byproducts such as ethanol or any number of other sugar byproducts using techniques known to those of skill in the art.

After removal of the sulfuric acid from the aqueous stream 118 using Solvent A 122 and liquid-liquid extraction, the sulfuric acid can then be separated from Solvent A in stream 124. In the embodiment shown in FIG. 2, the stream 124 comprising sulfuric acid and Solvent A can be introduced to additional liquid-liquid extraction equipment 134. In this liquid-liquid extraction 134, a second sulfuric acid-specific, water insoluble solvent 136 is introduced to the stream 124 in the liquid-liquid extraction unit 136. The second solvent 136 (Solvent B) is different from Solvent A 122 (or whatever solvent was used in the other liquid-liquid extraction 120). For example, Solvent B 136 can be selected so as to preferably extract sulfuric acid over Solvent A 122 following the liquid-liquid extraction 134. Likewise, Solvent B 136 can also be selected so as to facilitate separation of sulfuric acid from Solvent B. For example, Solvent B 136 can have a relatively low boiling point to facilitate separation via distillation as discussed below. One non-limiting example of a solvent that can be used as Solvent B 136 in some embodiments of the present invention is methyl ethyl ketone. The amount of Solvent B to be utilized can be determined by those skilled in the art based on the amount and flow rate of stream 124, the amount of sulfuric acid in the stream 124, the size of the liquid-liquid extraction equipment, and other factors.

After the liquid-liquid extraction 134 using Solvent B 136, a stream 138 comprising sulfuric acid and Solvent B and another stream 140 comprising Solvent A leave the extraction unit 134. Solvent A 140 recovered from the extraction unit 134 can be re-used in other production steps including, for example, as part of stream 104 to the liquid-liquid extraction following the hydrolysis reaction and/or as part of stream 122 to the second liquid-liquid extraction unit 120. Likewise, Solvent A 140 can also be stored for subsequent use.

The stream 138 comprising sulfuric acid and Solvent B can be transported to a distillation unit 142 where sulfuric acid 144 can be separated from Solvent B 146 due to differences in their boiling points. Persons of ordinary skill in the art can readily determine the appropriate equipment and conditions to conduct the distillation. Solvent B 146 recovered from the distillation unit 142 can be re-used in other production steps including, for example, as part of stream 136 to liquid-liquid extraction unit 134 and/or as part of stream 150 to liquid-liquid extraction unit 148 shown in FIG. 3. Likewise, Solvent B 146 can also be stored for subsequent use. The sulfuric acid can also be used again, for example, as part of the aqueous sulfuric acid stream provided to the reactor 100 to form the CNC, or stored for other uses.

Turning now to FIG. 3, FIG. 3 relates to the recovery of sulfuric acid from Solvent A in the stream 106 following liquid-liquid extraction of sulfuric acid from the aqueous stream 104 of CNC and polysaccharides (shown in FIG. 1). In some embodiments, as noted above, a majority (or more) of the sulfuric acid provided to the reactor 100 can be recovered from the stream 106 comprising sulfuric acid and Solvent A. In the embodiment shown in FIG. 3, the stream 106 comprising sulfuric acid and Solvent A can be introduced to another piece of liquid-liquid extraction equipment 148. In this liquid-liquid extraction 148, a second sulfuric acid-specific, water insoluble solvent 150 is introduced to the stream 106 in the liquid-liquid extraction unit 148. The second solvent 150 is different from Solvent A 104 (or whatever solvent was used in the liquid-liquid extraction following the reaction 100). As shown in FIG. 3, the second solvent 150 (Solvent B) can be the same solvent as is used in the liquid-liquid extraction 134 to extract sulfuric acid from Solvent A in stream 124. As noted above, Solvent B 150 can be selected so as to preferably extract sulfuric acid over Solvent A 104. Likewise, Solvent B 150 can also be selected so as to facilitate separation of sulfuric acid from Solvent B following the liquid-liquid extraction 148. For example, Solvent B 150 can have a relatively low boiling point to facilitate separation via distillation as discussed below. One non-limiting example of a solvent that can be used as Solvent B 150 in some embodiments of the present invention is methyl ethyl ketone. The amount of Solvent B to be utilized can be determined by those skilled in the art based on the amount and flow rate of stream 106, the amount of sulfuric acid in the stream 106, the size of the liquid-liquid extraction equipment, and other factors.

After the liquid-liquid extraction 148 using Solvent B 150, a stream 152 comprising sulfuric acid and Solvent B and another stream 154 comprising Solvent A leave the extraction unit 148. Solvent A 154 recovered from the extraction unit 148 can be re-used in other production steps including, for example, as part of stream 104 to the liquid-liquid extraction following the hydrolysis reaction and/or as part of stream 122 to the second liquid-liquid extraction unit 120. Likewise, Solvent A 154 can also be stored for subsequent use.

The stream 152 comprising sulfuric acid and Solvent B can be transported to a distillation unit 156 where sulfuric acid 158 can be separated from Solvent B 160 due to differences in their boiling points. Persons of ordinary skill in the art can readily determine the appropriate equipment and conditions to conduct the distillation. Solvent B 160 recovered from the distillation unit 156 can be re-used in other production steps including, for example, as part of stream 150 to liquid-liquid extraction unit 148 and/or as part of stream 136 to liquid-liquid extraction unit 134 shown in FIG. 2. Likewise, Solvent B 158 can also be stored for subsequent use. The sulfuric acid can also be used again, for example, as part of the aqueous sulfuric acid stream provided to the reactor 100 to form the CNC, or stored for other uses.

General

Unless indicated to the contrary, the numerical parameters set forth in this specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

That which is claimed:

1. A method for manufacturing cellulose nanocrystals comprising:
reacting lignocellulosic fibers with sulfuric acid in water;
introducing a water-insoluble solvent to substantially terminate the reaction;
separating a first stream comprising at least 70% of the unreacted sulfuric acid in the water-insoluble solvent from a second stream comprising a plurality of cellulose nanocrystals and the remainder of the unreacted sulfuric acid in water;
recovering the unreacted sulfuric acid in the second stream, wherein said recovering comprises introducing a second water-insoluble solvent to the second stream, separating a third stream comprising the unreacted sulfuric acid and the second water-insoluble solvent from a fourth stream comprising water, and separating the unreacted sulfuric acid from the second water-insoluble solvent; and
separating the cellulose nanocrystals from the second stream.

2. The method of claim 1, further comprising adding water to the second stream prior to separation of the cellulose nanocrystals.

3. The method of claim 1, wherein the recovering the unreacted sulfuric acid in the second stream comprises recovering substantially all of the unreacted sulfuric acid in the second stream.

4. The method of claim 3, wherein recovering substantially all of the unreacted sulfuric acid in the second stream comprises introducing a second water-insoluble solvent to the second stream, separating a third stream comprising substantially all of the unreacted sulfuric acid and the second water-insoluble solvent from a fourth stream comprising water, and separating substantially all of the unreacted sulfuric acid from the second water-insoluble solvent.

5. The method of claim 4, wherein the second water-insoluble solvent is the same as the first water-insoluble solvent.

6. The method of claim 4 wherein the fourth stream further comprises polysaccharides.

7. The method of claim 4, wherein separating substantially all of the unreacted sulfuric acid from the second water-insoluble solvent comprises introducing a third water-insoluble solvent to the third stream, separating a fifth stream comprising substantially all of the unreacted sulfuric acid and the third water-insoluble solvent from a sixth stream comprising the second water-insoluble solvent.

8. The method of claim 7, further comprising separating substantially all of the unreacted sulfuric acid from the third water-insoluble solvent.

9. The method of claim 7, wherein the third water-insoluble solvent is different from the first water-insoluble solvent and the second water-insoluble solvent.

10. The method of claim 7, wherein the third water-insoluble solvent has a lower boiling point than the first water-insoluble solvent and the second water-insoluble solvent.

11. The method of claim 1, further comprising recovering substantially all of the unreacted sulfuric acid in the first stream.

12. The method of claim 11, wherein recovering substantially all of the unreacted sulfuric acid in the first stream comprises introducing a second water-insoluble solvent to the first stream, separating a fifth stream comprising substantially all of the unreacted sulfuric acid and the second water-insoluble solvent from a sixth stream comprising the first water-insoluble solvent, and separating substantially all of the unreacted sulfuric acid from the second water-insoluble solvent.

13. The method of claim 12, wherein the second water-insoluble solvent is different from the first water-insoluble solvent.

14. The method of claim 12, wherein the second water-insoluble solvent has a lower boiling point than the first water-insoluble solvent.

15. The method of claim 1, wherein the first stream comprises at least 80% of the unreacted sulfuric acid.

16. The method of claim 1, wherein the second stream further comprises dissolved polysaccharides.

17. A method for manufacturing cellulose nanocrystals comprising:
- reacting lignocellulosic fibers with sulfuric acid in water;
- introducing a water-insoluble solvent to the solution to substantially terminate the reaction;
- separating a first stream comprising at least 70% of the unreacted sulfuric acid in the water-insoluble solvent from a second stream comprising a plurality of cellulose nanocrystals and the remainder of the unreacted sulfuric acid in water;
- adjusting the pH of the second stream to greater than about 1;
- separating the cellulose nanocrystals from the second stream; and
- recovering substantially all of the unreacted sulfuric acid in the second stream, wherein said recovering comprises:
  - introducing a second water-insoluble solvent to the second stream,
  - separating a third stream comprising substantially all of the unreacted sulfuric acid and the second water-insoluble solvent from a fourth stream comprising water, and
  - separating substantially all of the unreacted sulfuric acid from the second water-insoluble solvent.

18. The method of claim 17, wherein the second water-insoluble solvent is the same as the first water-insoluble solvent.

19. The method of claim 17, wherein the fourth stream further comprises polysaccharides.

20. The method of claim 17, further comprising recovering substantially all of the unreacted sulfuric acid in the first stream.

21. The method of claim 20, wherein recovering substantially all of the unreacted sulfuric acid in the first stream comprises introducing a second water-insoluble solvent to the first stream, separating a fifth stream comprising substantially all of the unreacted sulfuric acid and the second water-insoluble solvent from a sixth stream comprising the first water-insoluble solvent, and separating substantially all of the unreacted sulfuric acid from the second water-insoluble solvent.

22. The method of claim 21, wherein the second water-insoluble solvent is different from the first water-insoluble solvent.

23. The method of claim 21, wherein the second water-insoluble solvent has a lower boiling point than the first water-insoluble solvent.

24. The method of claim 17, wherein the first stream comprises at least 80% of the unreacted sulfuric acid.

25. The method of claim 17, wherein the second stream further comprises dissolved polysaccharides.

* * * * *